2,793,134
WATER DISPERSIBLE CARBON BLACK

Ira Williams, Borger, Tex., assignor to J. M. Huber Corporation, Borger, Tex., a corporation of New Jersey No Drawing. Application March 13, 1953, Serial No. 342,280

7 Claims. (Cl. 106—307)

This invention relates to carbon black and more particularly to water dispersible densified carbon black and a method for its preparation.

Carbon black as manufactured either by the channel process or the furnace process is first recovered as a fluffy powder which weighs from 2 to 5 pounds per cubic foot. Carbon in this form is not only bulky to transport but creates a great dust nuisance when it is used. In order to overcome these disadvantages it is common practice to densify the carbon by pressing or by rolling or mixing either in the wet or dry condition until the carbon is in the form of small beads which flow readily and can be transported economically in bulk. Carbon of this nature is usually referred to as compacted or pelletized carbon. In other cases the carbon is densified by pressing it in hydraulic presses under a high load.

Densified carbon as heretofore known is difficult to break up into a condition approaching its original small particle size, and this seriously limits its usefulness. When added to the beater for the purpose of coloring paper densified carbon only partially disintegrates, and particles of undispersed carbon remain throughout the resulting paper. Even the high shearing action in a cement mixer does not completely disperse compacted carbon. Similar problems result when attempts are made to use compacted or otherwise densified carbon in water-based paints and inks. Carbon weighing more than about 18 pounds per cubic foot has sufficient resistance to dispersion to be classed as densified carbon.

An object of the present invention is to provide a method for preparing densified carbon in an easily water dispersible form. Another object is to provide a dense and non-dusty carbon black material for use in coloring aqueous systems. A still further object is to provide a new form of compacted carbon which has a variety of advantageous uses as a coloring or pigmentary susbtance.

According to this invention, the foregoing and other objects and advantages can be accomplished by dispersing particles of a swelling type of bentonite in carbon black and densifying the dispersion, thus producing a densified carbon containing dispersed particles of swelling bentonite. Products of this character densified to a weight of more than about 18 pounds per cubic foot constitute a new commodity which can be used to important advantages in the production of black papers or paper boards, water-based paints, water-based inks, and in other ways.

Compacted carbon usually weighs from 25 to 30 pounds per cubic foot and the actual apparent density of a single pellet may be around 45 pounds per cubic foot. This means that the pellet of compacted carbon is not uniformly solid but is sponge-like or porous and can be penetrated by water. Carbon densified by pressing is of a similar nature but is usually more easily broken up than compacted carbon which is in the form of pellets or beads.

The forces caused by the penetration of water into a pellet of ordinary compacted carbon are sufficient to break the pellet into several smaller pieces but are not of a nature to disintegrate it completely. The penetration of water into a pellet of carbon containing particles of dispersed bentonite breaks it not only by the penetrating action of the water but by the swelling action of each particle of bentonite.

The disintegrating action of the swelling bentonite depends on the number of particles distributed through the carbon. For this reason the bentonite should be in the form of small particles since the same weight of bentonite produces an increasing number of particles as the size of the particles are decreased and therefore separates the carbon at a greater number of points.

The bentonites useful according to this invention are all of the swelling type but may vary considerably in chemical composition. In general, they are montmorillonitic minerals of which the principal constituent is montmorillonite, this constituent being responsible for their ability to swell and usually being present in association with sodium. Their composition, however, may vary considerably and may even contain considerable amounts of such substances as calcium and magnesium. Suitable materials have the property of being swellable by water to at least about three times their normal dry volume. They are typified by Wyoming bentonites and similar materials, among which are finely divided products available under the trade names Aquagel, BC Volclay, National Standard Bentonite, Magcogel and Control Gel. As here used these materials preferably consist predominantly of particles smaller than 300 mesh.

The practice of this invention is further illustrated by the following examples:

Example 1

Channel carbon weighing about 4 pounds per cubic foot was tumbled in a rotating drum until it had formed into pepper sized beads weighing 25 pounds per cubic foot. Some of the same loose carbon was mixed with Wyoming bentonite which was predominantly less than 300 mesh to give a mixture containing, by weight, 75 parts of carbon and 25 parts of bentonite. An intimate mixture was then obtained by passing the product once through a screen mill. This mixture was tumbled until it had formed tiny pellets which weighed 29 pounds per cubic foot. 100 grams of each type of pellets were poured into 500 cc. of water. The bentonite pellets disintegrated and colored the water while the pure carbon pellets sank to the bottom and left the water clear. Each sample was then stirred for 10 minutes with a propeller type laboratory stirrer and the amount retained on a 100 mesh screen was determined. The straight carbon pellets gave a screen residue of 72.6% while the bentonite treated pellet gave a residue of only 1.1%.

Example 2

Channel black was made into a stiff paste by the addition of water and this paste was beaten with a pin agitator until small granules were formed. These granules were dried at 110° C. A swelling type of bentonite was made into a viscous smooth slurry in water and this slurry was used to introduce the bentonite into the carbon black. Sufficient slurry and water were used to give a stiff paste which could be broken into granules by agitation. Two different preparations were made, one of which contained 25% and the other 5% of bentonite. These were dried at 110° C. Screen residues were run as in Example 1. The untreated carbon gave a screen residue of 79%, the 25% bentonite material gave a screen residue of 3.2% and the 5% bentonite material left a residue of 17.1%.

Example 3

A high modulus furnace carbon was blended to contain 20% of 400 mesh bentonite and the mixture was passed once through a screen mill to provide a uniform dispersion of the products. This was then tumbled to give a compacted material in the form of small pellets which weighed 28 pounds per cubic foot. Pellets weighing 25 pounds per cubic foot were formed in the same manner from carbon containing no bentonite. Screen residues were then run as in Example 1. The untreated carbon gave a screen residue of 68% while the bentonite treated carbon gave a residue of only 1%.

*Example 4*

Channel carbon was intimately blended with 15 percent of 400 mesh bentonite which was still capable of remaining in a solid condition after treatment with four times its weight of water. This mixture was placed in a metal form and pressed under a load of 1000 pounds per square inch. The resulting product was a solid cake with an apparent density of 43 pounds per cubic foot. A similar cake weighing 38 pounds per cubic foot was made from channel carbon which contained no bentonite. Each sample was prepared for testing by crushing the cake to form particles which would pass a 10 mesh screen and wet screen tests were made as in Example 1. The bentonite treated carbon gave a residue of 0.9% on a 100 mesh screen while the carbon containing no bentonite gave a residue of 47%.

*Example 5*

Paper pulp was treated in the beater with 6% of the weight of the pulp of the two products prepared in Example 1. Hand sheets then made from each treated pulp. The sheet containing the untreated compacted carbon was grey and speckled with black particles of undispersed carbon. The sheet containing the bentonite treated carbon was uniformly black.

The amount of bentonite to be employed depends on the results desired. The incorporation of as little as 1% of 400 mesh bentonite in compacted carbon black will reduce the 100 mesh screen residue to one-half or less. On the other hand, the dispersing action of the bentonite does not increase materially after about 40% is reached. Compacted carbon containing about 25% of dispersed bentonite particles is preferred for most purposes.

It will be understood that the details and examples set forth hereinabove are illustrative and that the invention herein disclosed may be practiced in various other ways without departing from the principles of the disclosure or the scope of the appended claims.

I claim:

1. A water dispersible carbon black coloring material in the form of discrete porous agglomerates consisting essentially of a major proportion of finely divided carbon black and a minor proportion of a finely divided substantially dry swellable bentonite, in the form of a porous dispersion thereof densified to a weight of more than 18 pounds per cubic foot and containing, by weight, between 1 and 40% of said bentonite interspersed evenly among the particles of said carbon black.

2. A carbon black coloring material in the form of discrete substantially dry porous agglomerates each consisting essentially of fine carbon black particles evenly interspersed with fine substantially dry particles of swellable bentonite, said material being densified to a weight of at least 18 pounds per cubic foot, the bentonite content of each agglomerate being between 5 and 40% of its weight.

3. A carbon black coloring material in the form of discrete substantially dry porous agglomerates each consisting essentially of fine carbon black particles evenly interspersed with fine substantially dry particles of a swellable bentonite predominantly smaller than 300 mesh in particle size, said material being densified to a weight of at least 18 pounds per cubic foot, the bentonite content of each agglomerate being between 5 and 40% of its weight.

4. A carbon black coloring material in the form of a flowable mass of discrete substantially dry porous pellets each composed essentially of carbon black particles interspersed and agglomerated with fine particles of swellable bentonite, the bentonite content of each pellet being between 5 and 40% of its weight, the bulk weight of said mass exceeding 18 pounds per cubic foot.

5. The method of preparing a black coloring material for use in aqueous media which comprises dispersing finely divided substantially dry swellable bentonite in a substantially undensified dry mass of fluffy dry finely taining, by weight, between 5 to 40% of said bentonite, and compacting said fluffy dispersion so as to convert it into discrete substantially dry porous agglomerates of interspersed particles of said carbon black and said bentonite having a bulk weight exceeding 18 pounds per cubic foot.

6. A carbon black coloring material comprising a flowable mass of discrete substantially dry porous pellets each composed essentially of a major proportion of fine carbon black particles and between 15 and 40% by weight of fine particles of swellable bentonite interspersed and agglomerated therewith, the bentonite particles being predominantly smaller than 300 mesh in particle size, the bulk weight of said mass exceeding 18 pounds per cubic foot.

7. A carbon black coloring material in the form of discrete porous agglomerates consisting essentially of a major proportion of finely divided carbon black and a minor proportion of a finely divided substantially dry swellable bentonite, in the form of a compacted porous dispersion thereof densified to a weight of more than 18 pounds per cubic foot and containing, by weight, between 1 and 40% of said bentonite interspersed evenly among the particles of said carbon black.

References Cited in the file of this patent

UNITED STATES PATENTS

| | | |
|---|---|---|
| 1,509,478 | Kraus | Sept. 23, 1924 |
| 1,818,770 | Tuley | Aug. 11, 1931 |
| 2,039,766 | Billings et al. | May 5, 1936 |
| 2,178,382 | Wiegand | Oct. 31, 1939 |
| 2,230,353 | Kern | Feb. 4, 1941 |
| 2,264,892 | Schaefer | Dec. 2, 1941 |
| 2,266,638 | Hauser | Dec. 16, 1941 |
| 2,366,047 | Nerlinger | Dec. 27, 1944 |
| 2,427,238 | Swart | Sept. 9, 1947 |

FOREIGN PATENTS

| | | |
|---|---|---|
| 216,420 | Great Britain | May 29, 1924 |

OTHER REFERENCES

Technical Paper No. 438 of the Dept. of Commerce, Bureau of Mines, on Bentonite, Its Properties, Mining, Preparation and Utilization (1928).

6. A Berlin blue pigment produced according to claim 3.

References Cited in the file of this patent

UNITED STATES PATENTS

| | | |
|---|---|---|
| 2,251,871 | Gamble et al. | Aug. 5, 1941 |
| 2,335,760 | Hucks | Nov. 30, 1943 |
| 2,342,478 | Metz | Feb. 22, 1944 |
| 2,384,579 | Vesce | Sept. 11, 1945 |
| 2,445,770 | Fischer | July 27, 1948 |
| 2,454,453 | Huey et al. | Nov. 23, 1948 |
| 2,575,347 | Kumins et al. | Nov. 20, 1951 |